E. McGARVEY.
AUTOMATIC RECORDING SCALE.
APPLICATION FILED OCT. 3, 1911.
1,069,276.
Patented Aug. 5, 1913.
3 SHEETS—SHEET 1.
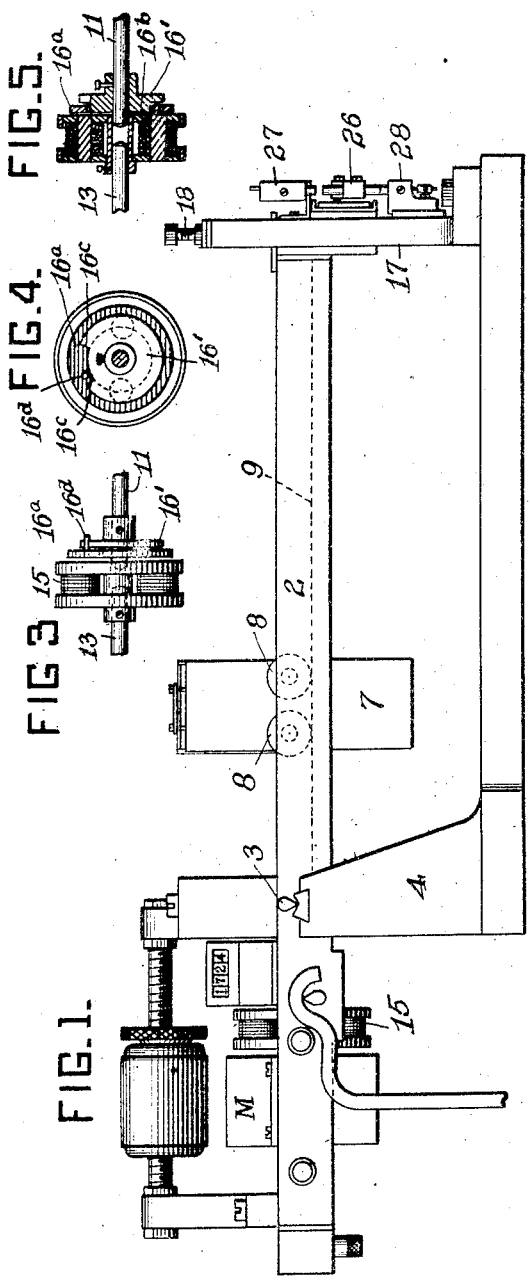
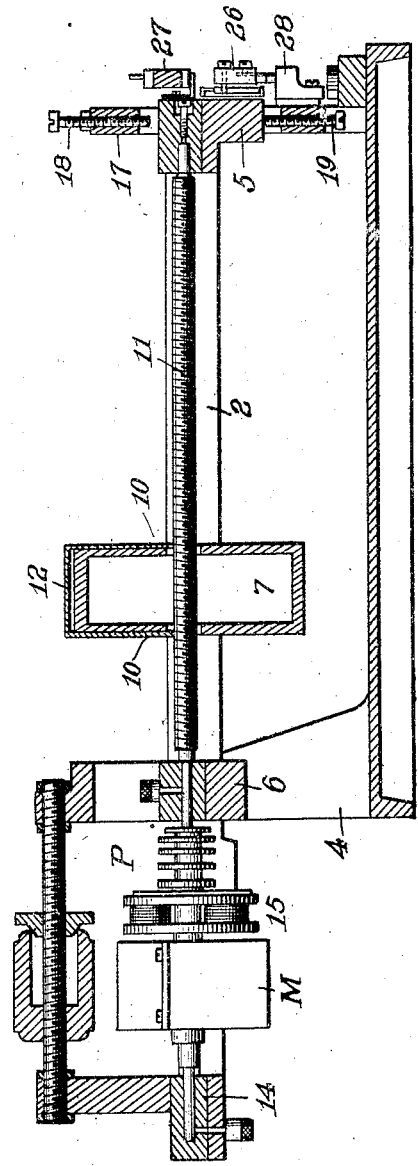
WITNESSES:
INVENTOR.

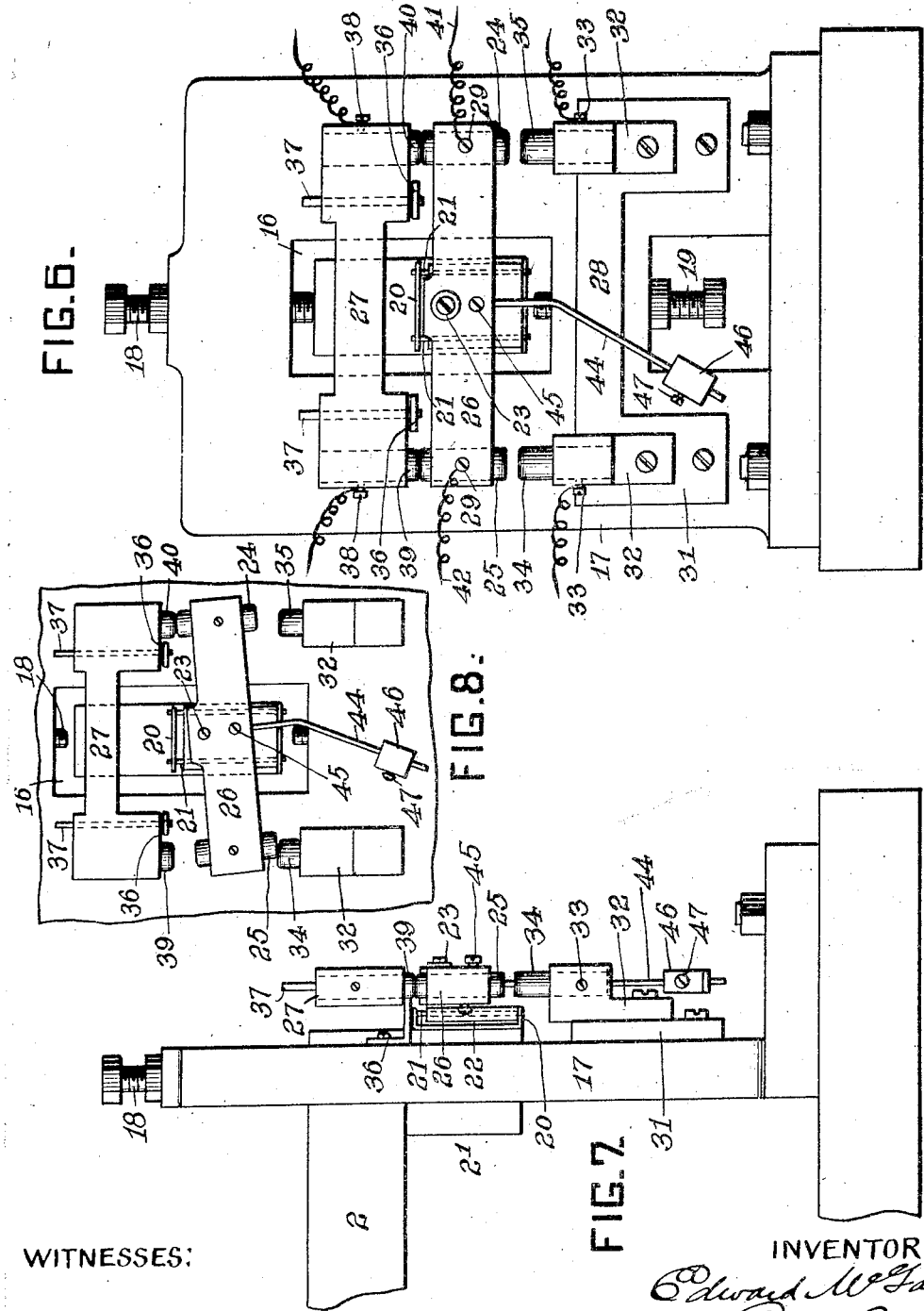

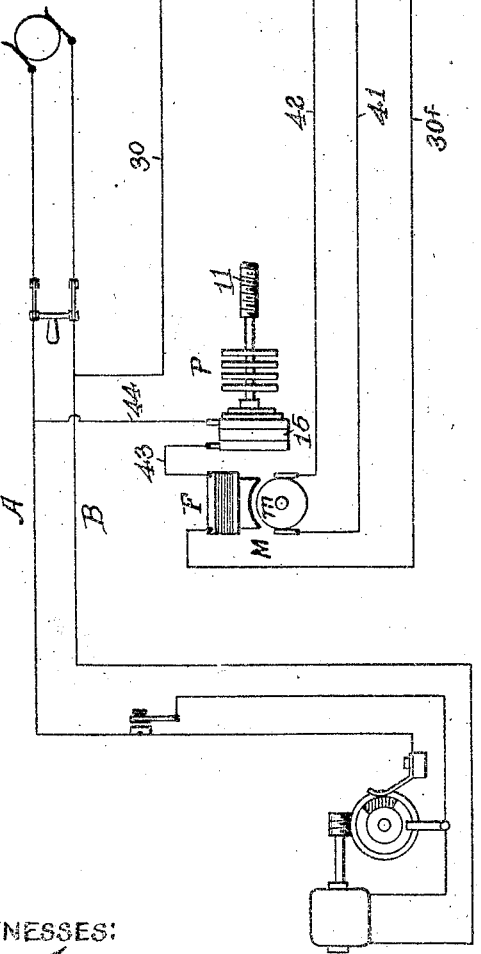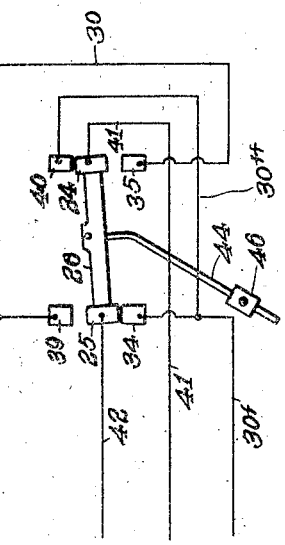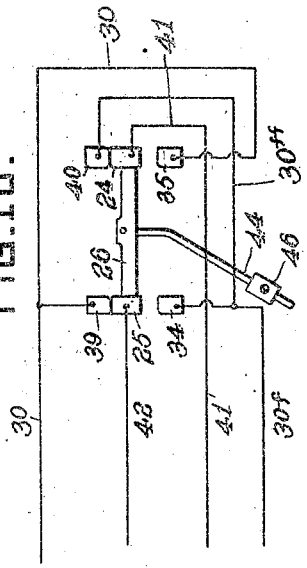

UNITED STATES PATENT OFFICE.

EDWARD McGARVEY, OF BELLEFONTE, PENNSYLVANIA, ASSIGNOR TO INTERNATIONAL ELECTRIC COMPANY, OF BELLEFONTE, PENNSYLVANIA, A CORPORATION OF ARIZONA.

AUTOMATIC RECORDING-SCALE.

1,069,276.

Specification of Letters Patent.

Patented Aug. 5, 1913.

Application filed October 3, 1911. Serial No. 652,631.

*To all whom it may concern:*

Be it known that I, EDWARD McGARVEY, a citizen of the United States, residing at Bellefonte, in the county of Center and State of Pennsylvania, have invented certain new and useful Improvements in Automatic Recording-Scales, of which the following is a specification.

My invention consists of an improvement in weighing scales, more particularly the class of automatic recording scales.

It is designed to provide an automatic recording scale adapted for rapid and accurate operation and embodies improvements in the trig loop mechanism, means for automatically balancing the scale beam mechanically in connection with the trig loop contact devices, for bringing the beam to a condition of rest, an improved magnetic clutch, together with other features of improved construction as will be more fully hereinafter described.

Generally stated, the apparatus comprises, in combination with the poise beam, an electrically actuated poise controlled by the operation of a motor which in turn is controlled by the trig loop contact mechanism, suitable printing mechanism for recording the results of each weighing operation, and this latter feature, however is the subject-matter of separate application filed herewith.

In the drawings: Figure 1 is a view of the poise beam of the scale and its parts in side elevation. Fig. 2 is a longitudinal vertical sectional view, centrally therethrough, indicating the motor, clutch and part of the printing mechanism in elevation. Figs. 3, 4 and 5 are detail views, illustrating the magnetic clutch. Fig. 6 is an enlarged view, in elevation, of the trig loop mechanism for making and breaking the contacts for control of the motor. Fig. 7 is a view of said mechanism in side elevation. Fig. 8 is a partial diagrammatic view, similar to Fig. 6, showing the automatic lever-controlled balancing device for bringing the poise beam to rest. Fig. 9 is a diagram of the wiring circuit and contact mechanism. Figs. 10 and 11 are similar partial diagrams of the trig loop contact mechanism in different positions.

In the drawings, 2 is the usual balancing beam of a scale mounted by knife edge bearings 3 in any suitable support, as bearings 4 extending upwardly from the base of the scale frame. The beam 2 is in the form of a rectangular frame having two oppositely arranged side bars joined at their ends by cross bars 5 and 6, of any suitable construction, the endmost bar 5 providing a bearing for the outer end of the poise feed screw and for mounting of the terminal movable contact member, the inner end 6 also providing a bearing for the motor shaft.

7 is the adjustable poise mounted by supporting wheels 8 at each side of supporting tracks 9 arranged longitudinally of the beam 2 at each side of its central open clearance space, and having interfitting engagement with the screw by suitable nut devices 10. These nuts engage the threads of the feed screw 11 by any suitable means, as a top spring or plate 12, whereby the poise is placed in feeding engagement with the threaded shaft. Upon rotation of the shaft in either direction, the poise 7 is located at the proper position on the beam to balance it in the same manner generally as is the ordinary poise of the usual weighing scale or as is the poise of recording scales of this type.

The machine is designed to operate automatically so that the poise will be located at the proper position, depending upon the weight of the goods or article being weighed, so as to bring the poise beam to a condition of rest in the shortest possible time.

For the purpose of actuating the screw 11 in one direction or the other to impart forward or backward travel of the poise, I provide a motor M, the armature of which and shaft 13 of the motor rotate in the usual way between the fields of the motor. Shaft 13 is provided at its outer end with a bearing terminal mounted in any suitable lubricated bearing 14 in the outer end of the beam, and is coupled at its inner end with the magnet, generally designated by the numeral 15.

The machine is provided with printing mechanism, indicated generally by the letter P, which it is not necessary herein to specifically describe, except to state that it consists of a series of printing wheels adapted to be properly positioned in conformity with the action of the feed screw 11, to print the characters indicating the weight in connection with a paper strip and ribbon, after the beam has come to equipoise, actuated through suitable mechanism P' controlled by a branch circuit and switch, and included more specifically in the companion application above referred to. It is also somewhat similar to the printing mechanism of my prior Patent No. 701757.

Inasmuch as the present invention refers particularly to the clutch mechanism, hereinafter described and to the trig loop contact mechanism and balance lever for bringing the beam to a condition of rest, these features will now be described. The contact mechanism, illustrated in detail in Figs. 6, 7 and 8, and in diagrams, Figs. 9, 10 and 11, is designed to provide an extremely sensitive, light and readily operative means for establishing electrical connection between the line wire at one side of the main supply circuit and the fields of the motor in one position, as when the outer end of the beam 2 is elevated, and between the same line wire and the fields of the motor in a reversed position of the beam, as when lowered, but with changed polarity or in reverse. It is also designed to provide a very sensitive mechanical balancing mechanism for quickly bringing the beam to a condition of rest, after the poise has assumed its final position of rest. The outer end of the beam extends into a clearance space 16 arranged centrally of an upwardly extending standard or housing 17 mounted upon the supporting base of the machine, in which space the end of the beam has a limited range of movement as controlled by adjustable set screws 18, 19. Either directly on the end of the beam, or upon a depending extension 2' thereof, is a bracket 20 carrying vertical pins 21, 21, on which is slidably mounted the block 22 having a limited range of vertical travel on pins 21. Pivotally mounted, as by stud 23 on said block 22, is an insulating bar 26, in the outer terminals of which are fixedly secured the carbon conductors 24, 25, respectively. Said conductors extend through the ends of bar 26 projecting above and below, as shown, providing continuous contacting conductors, and are fixedly secured in place by set screws or binding posts 29 to which are also connected the terminals of the conducting wires 41, 42, leading to the armature $m$ of the motor M. Below the beam terminal and its pivoted contacting bar 26 is located an insulating bracket or block 31, secured upon the face of the housing frame 17, upon which are mounted insulated brackets 32, 32, in one of which is secured by a binding post or set screw 33 the carbon contact 34, and in the other of which, by a similar set screw 33, is secured a similar carbon contact 35. Said contacts 34 and 35 are stationary, but adjustable as to their height for compensation of wear, etc. Above the pivoted bar 26 are brackets 36, one at each side, carrying vertical pins or studs 37, 37, upon which is slidingly mounted the insulating bar 27, in the outer ends of which are secured by set screws or binding posts 38, 38. Carbons 35 and 39 are connected, by a branch connection 30 and conductor $30^n$ with one side B of the main circuit and contacts 40 and 34 are connected by branch connection $30^{rr}$ and conductor $30^f$ with the motor fields F. The set screws 18, 19, having been adjusted to provide for the desired or necessary range of movement of the outer end of beam 2, and the beam being actuated by the weighing operation, makes contact, by upward travel of its outer end by carbons 24, 25, with carbons 40, 39 (see Fig. 10). Circuit is then established from the main line conductor B, branch $30^n$, terminal 39 to 25, conductor 42 to armature $m$ and by conductor 41, terminal 24 to terminal 40, branch $30^{rr}$ and conductor $30^f$ to the fields F of the motor M and thence through conductor 43, clutch 15, and conductor 44 to the other main conductor A.

Operation of the motor in the proper direction or as controlled by the thread of the screw 11, will then shift the poise 7 outwardly along the beam 2 slightly beyond the point of equipoise, tilting the beam downwardly, breaking the circuit and establishing a circuit of reverse polarity, bringing the contacts 24, 25, against lower contacts 35 and 34 respectively. The reverse circuit is then established from main line conductor B, wire 30, contacts 35 and 24 and conductor 41 to the armature $m$ of the motor, and from thence through conductor 42, contacts 25, 34, conductor $30^f$ to the field F of the motor, and thence by conductor 43 to clutch 15 and conductor 44 to the other side A of the main circuit. Reverse movement of the screw 11 then shifts the poise 7 backwardly, operating to separate the contacts 24, 25, and 35, 34, on upward movement of the beam, the operation continuing until the beam has reached a position of rest and the poise is in proper weighing position. For the purpose of assisting the beam in quickly assuming a position of rest, as in the case of a top heavy beam, the pivoted bar 26 is designed to operate as a lever bearing by its opposite terminal contact members against the diagonally located contacts 40 and 34, respectively (see Fig. 11). This operation is accomplished through a counterweighted lever 44, fixedly secured in the central portion of bar 26 by a set screw 45, said lever depending downwardly below the bar and being abruptly bent to one side and provided with an adjustable counterweight 46 having a securing set screw 47. The mounting of the bar 26 by its pivotal support 23 on block 22, and the mounting of said block on the vertical stems 21, renders the action of the beam very easy and sensitive.

While its action in no way retards or interferes with the free reciprocation of the end of the beam, for establishing the contacts above described in either raised or lowered position, its lever action as tilted by the counterweight 46, quickly affects the highly sensitive beam terminal to cause it to assume an intermediate position, and to quickly separate the current establishing terminals. It will be seen that in the position of the lever 26 when tilted, contacts 25, 34, and 40, 24, are brought together, but without closing the operative circuit with the main conductor B, so that the action is simply mechanical. The special advantage of this latter feature is in its time efficiency in quickly counteracting any oversensitive action of the beam, and without in any way impairing the efficiency of the electrical contact mechanism. Also, that the pins 21 and 37 provide for free sliding of the mounting of bar 26 and bar 27, compensating for any wear or inequality in balance of these parts. In this respect the contact carriers 26 and 27 are "floating" i. e. they are capable of considerable movement on their mountings adapting them to automatic adjustment. It is designed that the screw shaft shall be subject to magnetic clutch engagement with magnet 15, for which purpose it is provided with a disk 16′ secured to the inner end of the threaded shaft 11, whereby said shaft is rotatably coupled with the magnet and motor shaft and will rotate with it in either direction when the motor is operated in one direction or the other.

The construction of the magnetic clutch is shown in detail in Figs. 3, 4 and 5. It is designed to provide, by the magnetic clutch, a coupling connection between the motor M and the poise screw 11 which shall be sufficiently flexible in its operation to allow a short period of time to elapse after a contact is made at the outer end of the beam, either up or down, before the screw begins to turn. This slight delay or discounting of the operation is desirable in interposing a slight delay in imparting rotation to the screw, after the beam has closed contact, and before it is reversed. I thereby allow for the inertia of the beam. Also, by reason of the momentum of the motor the magnetic clutch is of advantage in that immediate uncoupling of the motor M and shaft 11 is effected, the factors of small inertia and high friction of the shaft avoiding any tendency to rotate after the connection is broken. The magnet is secured to the motor shaft 13 by its hub and a set screw or key. The end of screw shaft 11 extends freely into the hub of the field and is provided with a fixedly secured disk 16′, as stated, while an armature disk or ring $16^a$ is mounted for partial rotation upon an inwardly extending reduced hub of the disk 16′. Disk 16′ is provided with a segmental shaped clearance opening between the annularly spaced shoulders or abutments $16^c$, $16^c$, while a pin $16^d$ is secured to armature ring $16^a$ and extends into said opening. Upon the field being energized by closing of the circuit through connections 43, 44, the magnetized field will rotate in the desired direction, and pin $16^d$ will move annularly through the segmental space until it comes into contact with one of the shoulders $16^c$, whereupon motion will be transmitted to shaft 11. The lost motion of the pin $16^d$ thus accomplishes the retardation and desired delay in actuation of the poise.

What I claim is:

1. In a scale, the combination with spaced contact terminals and circuit connections thereto, of a scale beam having a flexibly mounted sliding contact carrier having contacts adapted to engage said terminals.

2. In a scale, the combination with spaced contact terminals and circuit connections thereto, of a scale beam having a pivoted sliding bar provided with contacts adapted to engage said terminals.

3. In a scale, the combination with spaced contact terminals and circuit connections thereto, of a scale beam having a slidably mounted block, and a carrier pivoted thereon provided with contacts adapted to engage said terminals.

4. In a scale, the combination with spaced contact terminals and circuit connections thereto, of a scale beam having a flexibly mounted sliding contact carrier having rigid contacts adapted to engage said terminals.

5. In a scale, the combination with pairs of spaced contact terminals and circuit connections thereto, one pair of said contact terminals being vertically movable, of a scale beam having a slidably mounted pivoted rigid contact member adapted to engage said terminals.

6. In a scale, the combination with a fixedly secured pair and a loosely mounted pair of contact terminals and circuit connections thereto, of a vibrating beam having at its end a pivotally mounted bar provided with contacts adapted to engage said terminals.

7. In a scale, the combination with fixedly secured contact terminals and circuit connections thereto, of a vibrating beam having at its end a slidably mounted block and a bar pivotally mounted thereon having contacts adapted to engage said terminals.

8. In a scale, the combination with a pair of fixedly secured lower contact terminals and a pair of vertically movable upper contact terminals, and circuit connections thereto, of a vibrating beam having at its end a pivotally mounted bar provided with contacts adapted to engage said terminals.

9. In a scale, the combination of an apertured housing provided with limiting set screws, a beam extending into the range of said set screws, pairs of lower and upper contact terminals mounted on said housing, a pivoted contact carrier on the beam having contact terminals, and circuit connections for said several terminals.

10. In a scale, the combination of an apertured housing provided with limiting set screws, a beam extending into the range of said set screws, pairs of lower and upper contact terminals mounted on said housing, a bracket and pins secured to the end of the beam, a slidable block carried thereby, a contact carrier having conducting terminals pivoted on said slidable block, and circuit connections for said several terminals.

11. In a scale, the combination with pairs of lower and upper contact terminals, of a pivoted beam, and a counterweighted contact bar pivotally mounted on the beam intermediate said terminals adapted to make contact with said terminals by its opposite ends and to operate as an equalizing lever.

12. In a scale, the combination with pairs of lower and upper contact terminals, of a pivoted beam, and a contact bar pivotally mounted on the beam intermediate said terminals, operable to make contact with said terminals by its opposite ends, and having a tilting lever arm, disposed toward one side of the pivotal mounting of the contact bar.

13. In a scale, the combination with pairs of lower and upper contact terminals, of a vibrating beam, and a pivotally mounted contact bar intermediate said terminals having a tilting counterweighted lever arm.

14. In a scale, the combination with the feed screw and the motor, of a rotatable magnetic clutch secured to the motor shaft, a shouldered disk secured to the feed screw, and an armature for the magnetic clutch having an abutment extending between the shoulders of said disk, substantially as set forth.

15. In a scale, the combination with the feed screw and the motor, of a rotatable magnetic clutch secured to the motor shaft, a shouldered disk secured to the feed screw having a segmental opening and limiting shoulders, and an armature located between said disk and the magnet provided with a pin projecting into the path of said shoulders, substantially as set forth.

16. In a scale, the combination with the feed screw and the motor, of a rotatable magnetic clutch secured to the motor shaft, a shouldered disk secured to the feed screw having a segmental opening and limiting shoulders, and an armature located between said disk and the magnet provided with a pin projecting into the path of said shoulders, said disk having a hub providing bearing for said armature, substantially as set forth.

17. In a scale, the combination with a beam, a poise, a feed screw engaging the poise, an electric motor, a magnetic clutch connected to the shaft of the motor, an armature having a limited range of lost motion and adapted to effect clutching engagement between the magnetic clutch and the screw when the motor is energized, and means controlling the operation of the motor subject to the movement of the beam.

18. In a scale, the combination with a beam having a pivotally mounted contact terminal member, of a poise, a feed screw operatively geared to the poise, an electric motor, a shaft for the motor, a magnetic clutch interposed between the shaft of the motor and the screw for operatively connecting the two, and means for controlling the operation of the motor having contact terminals adapted to be engaged by the pivoted contact terminal member of the beam.

19. The combination with a scale beam, its poise and poise screw, an electric motor for actuating the poise screw, contact mechanism, and connections thereto for establishing current to the motor, of a magnetic clutch embodying lost motion means for connecting the motor with the screw.

20. The combination with a scale beam, its poise and poise screw, an electric motor for actuating the poise screw, contact mechanism and connections thereto for establishing current to the motor, of a magnetic clutch embodying initially inoperative clutch mechanism for connecting the motor with the screw.

21. A scale beam having a poise and feed screw therefor, an electric motor for actuating the feed screw, a magnet interposed directly between the motor and the feed screw for coupling the two together, and means embodying fixed and pivoted contact terminals at the tilting end of the beam for controlling the motor and clutch dependent on the position of the beam.

22. The combination of a scale beam, a poise, a feed screw, an electric motor for actuating the feed screw, a magnetic clutch interposed directly between the motor and the feed screw for coupling the two together, printing mechanism controlled by the screw, and contact mechanism embodying fixed contact terminals and a pivoted bar having terminals adapted to engage said terminals, and circuit connections for controlling the operation of the motor and clutch dependent on the position of the beam.

23. The combination of a poise beam, a feed screw, a poise, an electric motor, a magnetic clutch interposed directly between the motor and the feed screw, a limiting housing for the end of the beam provided with upper and lower contact devices, a pivotally mounted contact carrier on the beam, and circuit connections therefrom controlling the operation of the motor and clutch dependent on the position of the beam.

In testimony whereof I hereunto affix my signature in the presence of two witnesses.

EDWARD McGARVEY.

Witnesses:
C. M. CLARKE,
FREDK. STAUB.